(12) United States Patent
Chuda et al.

(10) Patent No.: US 11,761,260 B2
(45) Date of Patent: Sep. 19, 2023

(54) WINDOW OR DOOR ELEMENT PROVIDED WITH CONNECTION PINS

(71) Applicant: SAINT-GOBAIN GLASS FRANCE, Courbevoie (FR)

(72) Inventors: Katarzyna Chuda, Asnieres sur Seine (FR); Louis Cravero, Compiegne (FR); Christophe Baillet, Bailleul le Soc (FR); Richard Wolff, Pronleroy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 208 days.

(21) Appl. No.: 17/287,866

(22) PCT Filed: Oct. 24, 2019

(86) PCT No.: PCT/EP2019/079094
§ 371 (c)(1),
(2) Date: Apr. 22, 2021

(87) PCT Pub. No.: WO2020/084083
PCT Pub. Date: Apr. 30, 2020

(65) Prior Publication Data
US 2021/0396071 A1    Dec. 23, 2021

(30) Foreign Application Priority Data

Oct. 26, 2018    (FR) ........................... 1859932

(51) Int. Cl.
*E06B 3/67* (2006.01)
*E06B 3/54* (2006.01)
(Continued)

(52) U.S. Cl.
CPC .......... *E06B 3/6722* (2013.01); *E06B 3/5454* (2013.01); *E06B 3/6621* (2013.01);
(Continued)

(58) Field of Classification Search
CPC .. E06B 3/5454; E06B 3/6621; E06B 3/66309; E06B 3/6722; E06B 2003/5472; E06B 2009/2464; E06B 2009/247
See application file for complete search history.

(56) References Cited

U.S. PATENT DOCUMENTS 207,801 A      9/1878  Easton
4,397,117 A *  8/1983  Shipp .................... E06B 3/5454
                                                        49/501

(Continued)

FOREIGN PATENT DOCUMENTS

DE    4031176 A1 *  4/1992
FR    2 701 996 A1   9/1994

(Continued)

OTHER PUBLICATIONS

English machine translation of FR-3080402-A1. Accessed Jan. 13, 2023.*

(Continued)

*Primary Examiner* — Christine T Cajilig
(74) *Attorney, Agent, or Firm* — Pillsbury Winthrop Shaw Pittman LLP

(57) ABSTRACT

A window or door element includes a frame and an insulated glazing unit removably disposed in the frame, the insulated glazing unit including at least one first electrical connection pin and the frame including at least one second electrical connection pin, the at least one first electrical connection pin of the insulated glazing unit being in electrical contact with the at least one second electrical connection pin of the frame when the insulated glazing unit is inserted into the frame.

18 Claims, 2 Drawing Sheets

(51) Int. Cl.
    *E06B 3/66*         (2006.01)
    *E06B 3/663*       (2006.01)
    *E06B 9/24*         (2006.01)
    *F21V 8/00*        (2006.01)

(52) U.S. Cl.
    CPC ............ *E06B 3/66309* (2013.01); *E06B 9/24* (2013.01); *G02B 6/0083* (2013.01); *G02B 6/0095* (2013.01); *E06B 2003/5472* (2013.01); *E06B 2009/247* (2013.01); *E06B 2009/2464* (2013.01)

(56) References Cited

U.S. PATENT DOCUMENTS

2010/0132301 A1* 6/2010 Horner .................. E06B 3/5892
                                              52/656.4
2013/0157493 A1* 6/2013 Brown ...................... E06B 3/66
                                                439/247
2015/0077832 A1* 3/2015 Berland .................... E06B 9/24
                                                359/275
2017/0139109 A1* 5/2017 Gierens ............. B32B 17/10055
2017/0170776 A1* 6/2017 Janowski ................ H02S 20/26

FOREIGN PATENT DOCUMENTS

FR          3080402 A1 * 10/2019 ............... E06B 3/54
WO    WO 2015/120063 A1    8/2015

OTHER PUBLICATIONS

International Search Report as issued in International Patent Application No. PCT/EP2019/079094, dated Nov. 13, 2019.

* cited by examiner

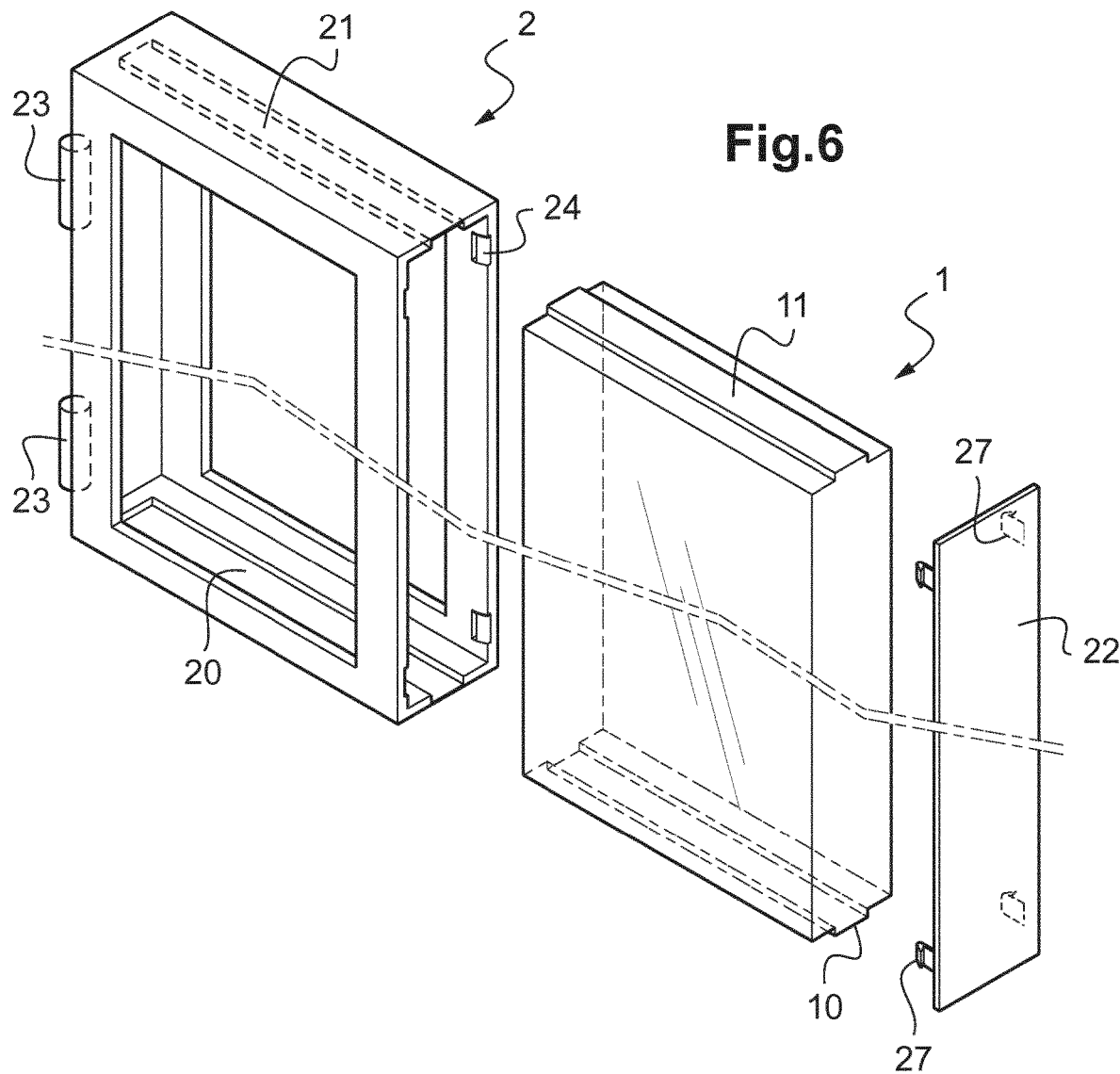

WINDOW OR DOOR ELEMENT PROVIDED WITH CONNECTION PINS

CROSS-REFERENCE TO RELATED APPLICATIONS

This application is the U.S. National Stage of PCT/EP2019/079094, filed Oct. 24, 2019, which in turn claims priority to French patent application number 1859932 filed Oct. 26, 2018. The content of these applications are incorporated herein by reference in their entireties.

The invention concerns a window or door element provided with connection pins.

Windows of buildings generally comprise a casing and a leaf articulated to the casing. The leaf is composed of a frame in which an insulated glazing unit is mounted.

Similarly, commercial refrigerators generally comprise a casing and a leaf articulated to the casing. The leaf is composed of a frame in which an insulated glazing unit is mounted.

The insulated glazing units are composed of at least two glass panes disposed parallel to one another and maintained apart by a spacer frame disposed in proximity to the edges of the glass panes. A gasket disposed between the spacer and the edges of the glass panes, between the glass panes, seals the insulated glazing unit.

Known from document WO 2015/120063 is a so-called 'smart' glazed window or door comprising a device that is optically actuable, such as an electrochromic device. The electrodes of the device are connected by connection wires to a first connector situated on the edge of the glazing unit or the leaf. This first connector is fixed magnetically or by wire to a second connector situated on a casing part of the door or window.

It can be useful to change the insulated glazing unit either because it is damaged, or to provide different functionalities to the window.

Indeed, it can occur that one of the glass panes of the glazing unit is broken, for example in the event of impact thereupon. In most cases, it is necessary to completely disassemble the window leaf in order to change the glazing unit. The disadvantage is that this operation is tedious because it requires disassembling the glazing beads, removing the positioning wedges from the glazing unit inside the frame, removing the glazing unit, repositioning the new glazing unit with wedges then reassembling the glazing beads.

Furthermore, there are glazing units that have various functionalities in terms of thermal and/or acoustic insulation, or functionalities requiring a supply of electricity. Now, a glazing unit provided with functionalities requiring an electrical supply must be supplied by a wired connection.

There is therefore a need for a window element that makes it possible to change an insulated window or door glazing unit, that must be electrically connected, without having to change the whole assembly.

For this purpose, the invention proposes a window or door element comprising a frame and an insulated glazing unit removably disposed in the frame, the insulated glazing unit comprising at least one, preferably two first electrical connection pin(s) and the frame comprising at least one, preferably two, second electrical connection pin(s), at least one, preferably two, of the first electrical connection pins of the insulated glazing unit being in electrical contact with at least one, preferably two, of the second electrical connection pins of the frame when the insulated glazing unit is inserted into the frame.

According to another feature, the insulated glazing unit comprises:
at least two glass panes spaced apart two by two by a spacer frame surmounted by a gasket, the spacer frame and the gasket being between the glass panes in proximity to the edge of the glass panes,
at least one device designed to be electrically supplied, disposed between two adjacent glass panes, each device designed to be electrically supplied being electrically connected to at least one, preferably two, of the first electrical connection pins of the insulated glazing unit.

According to another feature, different separate devices designed to be electrically supplied are connected to different first electrical connection pins, the assembly of the first electrical connection pins of the insulated glazing unit connected to a device designed to be electrically connected being in electrical contact with second electrical connection pins of the frame when the insulated glazing unit is mounted in the frame.

According to another feature, different second electrical connection pins of the frame can be connected at different voltages in order to adapt to the different type(s) of device(s), designed to be electrically supplied, of the insulated glazing unit.

According to another feature, the number of second electrical connection pins of the frame is greater than the number of first electrical connection pins of the insulated glazing unit.

According to another feature, the first electrical connection pins of the insulated glazing unit are attached in the gasket in such a way that the end of the first electrical connection pins is flush with the surface of the insulated glazing unit.

According to another feature, the second electrical connection pins of the frame are spring-loaded pins making it possible to ensure good electrical contact with the first electrical connection pins of the insulated glazing unit.

According to another feature, the at least one device designed to be electrically supplied is at least one of the following types:
an electroluminescent device comprising surface organic light emitting diodes (OLEDs) or an inorganic thin film electroluminescent layer (TFEL) or inorganic light-emitting diodes (LEDs),
an electrochromic device,
a liquid crystal variable diffusion device actuable between two states called transparent and opaque,
a device with a heating layer,
an active matrix display screen, particularly active matrix OLED screens,
a sensor.

According to another feature, in the event the electroluminescent device comprises inorganic light emitting diodes (LED), the latter also comprises a light guide and light extraction means, the inorganic light emitting diodes being disposed on a support of the printed circuit board type that is coupled to the edge of one light-guide forming sheet, said sheet being formed by one of the glass panes of the insulated glazing unit or by a sheet of transparent plastic disposed between two adjacent glass panes, preferably against one of the glass panes of the insulated glazing unit, and the light extraction means being on or in the light guide.

According to another feature, one of the edges of the frame is removable in order that the insulated glazing unit can easily be inserted therein or removed therefrom.

According to another feature, the removable edge of the frame is attached to the fixed part of the frame by snap-fitting or screwing.

According to another feature, the insulated glazing unit is provided with first slide elements on at least one of the edges thereof, preferably on two of the opposite edges thereof, and the frame is provided with second slide elements on at least one of the inner edges thereof, preferably on two of the opposite inner edges thereof, the first sliding elements of the insulated glazing unit being designed to cooperate with the second sliding elements of the frame in order to facilitate the insertion and removal of the insulated glazing unit relative to the frame.

The invention also concerns a window or door leaf designed to be articulated to a window or door casing, the window or door leaf comprising the window or door element described above, wherein the window or door element further comprises hinges on one of the edges thereof.

According to another feature, the edge provided with hinges is opposite to the removable edge.

The invention also relates to a window or door comprising a window or door leaf described above, and a window or door casing on which the window or door leaf is articulated.

Other characteristics and advantages of the invention will now be described with regard to the drawings, in which:

FIG. 6 represents an exploded view of a window or door element according to the invention;

The reference numbers that are identical in the various figures represent similar or identical elements.

The term "glass pane" should be understood as any transparent substrate having a glass function. It may be a pane of mineral glass or organic glass.

The invention relates to a window or door element comprising a frame and an insulated glazing unit removably disposed therein. The insulated glazing unit comprises at least one first electrical connection pin and the frame comprises at least one second electrical connection pin, at least one of the first electrical connection pins of the insulated glazing unit being an electrical contact with at least one of the second electrical connection pins of the frame when the insulated glazing unit is inserted into the frame.

Thus, in spite of the electrical connection, the insulated glazing unit remains removable relative to the frame.

Figure 1:
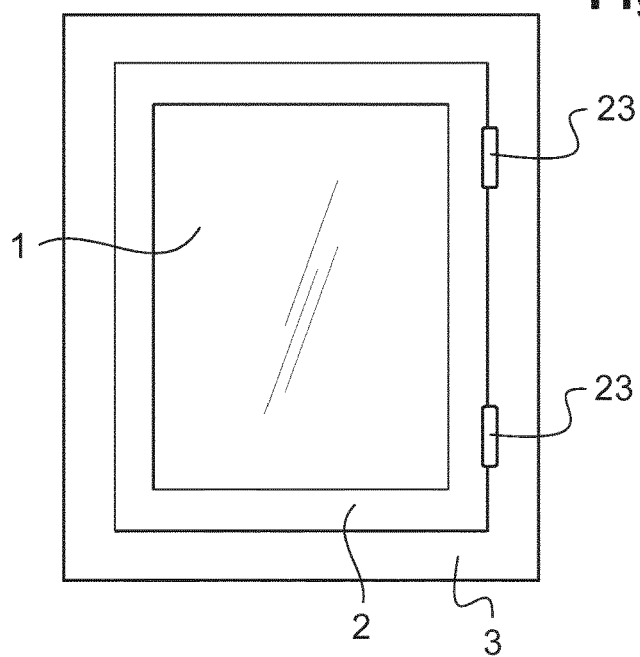
FIG. 1 represents a front view of a window or door according to the invention.

FIG. 1 represents a front view of a window or door according to the invention. The window or door comprises a casing 3 and a leaf articulated to the casing 3, for example by hinges 23. The leaf is composed of a frame 2 in which an insulated glazing 1 unit is inserted. The assembly formed by the frame 2 and the insulated glazing unit 1 is called window or door element.

Figure 2:
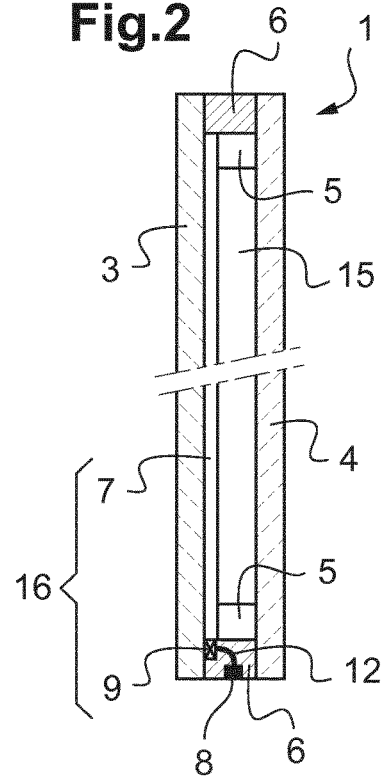
FIG. 2 represents a cross-sectional view of an insulated glazing unit of a window or door element according to the invention.

FIG. 2 represents a cross-sectional view of an insulated glazing unit of a window or door element according to the invention. The insulated glazing unit comprises at least two glass panes 3, 4 spaced apart by a gap of air or gas 15. A spacer frame 5 is disposed between the two glass panes 3, 4 in proximity to the edges of the glass panes. The spacer frame 5 is glued by the lateral faces thereof to two glass panes by a glue such as butyl forming a first barrier seal. The spacer is surmounted by a mastic gasket 6 between the glass panes to fill the space situated between the outer face of the spacer frame 2 and the edge of the glass panes 3, 4. The gasket 6 forms a second barrier seal.

The insulated glazing unit further comprises at least one device 16 designed to be supplied electrically, each device 16 being disposed between two adjacent glass panes 3, 4.

The end of each first electrical connection pin 8 oriented towards the exterior of the insulated glazing unit is intended to be in electrical contact with one of the ends of a second electrical connection pin 28 when the insulated glazing unit 1 is inserted into the frame 2 and the end of each first electrical connection pin 8 oriented towards the interior of the insulated glazing unit is connected by wired connection 12 to a device (16) designed to be electrically supplied.

The at least one device 16 designed to be electrically supplied can be, without limitation, one or more of the following types:
  a light emitting device comprising inorganic light emitting diodes (LEDs), surface organic light emitting diodes (OLEDs) or an inorganic thin film electroluminescent layer (TFEL),
  an electrochromic device,
  a liquid crystal variable diffusion device actuable between two states called transparent and opaque,
  a device with a heating layer,
  an active matrix display screen, particularly active matrix OLED screens,
  a sensor.

In the example illustrated in FIG. 2, the device 16 designed to be electrically supplied is an inorganic light-emitting diodes device. The device 16 designed to be electrically supplied then comprises a bar 9 of inorganic light emitting diodes (LEDs) and a sheet of transparent plastic 7, for example of polymethylmethacrylate (PMMA). The LED bar 9 comprises a printed circuit card on which a plurality of LEDs is disposed. The transparent plastic sheet 7 is disposed between the two glass panes 3, 4, preferably against one of the glass panes. The LED bar 9 is disposed along one of the edges of the transparent plastic sheet 7. The diffusing transparent plastic sheet 7, forms a light guide. As a variant, if the transparent plastic sheet is not diffusing, the device 16 further comprises light extraction means that are situated on the transparent plastic sheet.

As a variant (not shown), the inorganic light-emitting diodes device does not comprise a diffusing transparent plastic sheet: in this case, the LED bar 9 is disposed directly along the edge of one of the glass panes 3, 4 which will serve as light guide on the light-guide forming glass pane. The device then further comprises light extraction means on the light-guide forming glass pane.

The light extraction means can be small in size and form light-signaling such as a pictogram.

The insulated glazing unit 1 further comprises at least one first electrical connection pin 8 connected by a wired connection 12 to the device 16 designed to be electrically supplied.

Preferably, the insulated glazing unit 1 comprises two first electrical connection pins 8: one for the negative terminal and one for the positive terminal.

Some types of devices 16 designed to be supplied electrically need more than two electrical connection pins 8.

As concerns the types of devices 16 designed to be electrically supplied, different from the one exemplified in FIG. 2, some can comprise electrodes, such as for example the device with a heating layer, the electrochromic device or the liquid crystal variable diffusion device. Each electrode is then connected by a wired connection 12 to a first electrical connection pin 8.

In general, each connection necessary for each device 16 designed to be electrically connected is achieved by wired connection 12 to a first electrical connection pin 8 of the insulated glazing unit 1.

Figure 5:
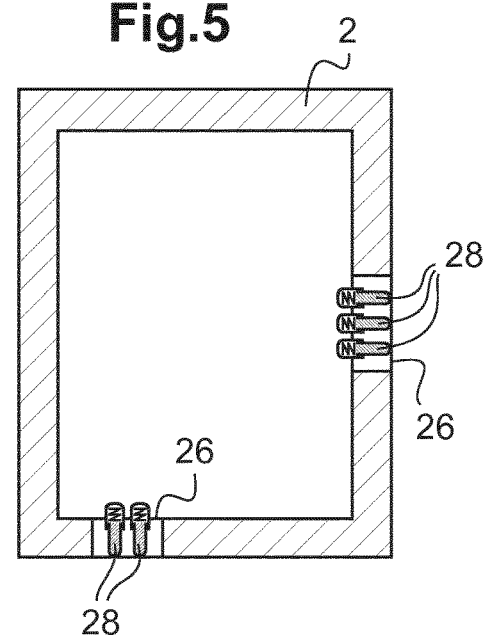
FIG. 5 represents a front view of a frame of a window or door element according to the invention.

The first electrical connection pins 8 of the insulated glazing unit 1 are preferably attached in the gasket 6 in such a way that the end of the first electrical connection pins 8 is flush with the surface of the insulated glazing unit 1, as can be seen in particular in FIG. 2. This arrangement facilitates the contact of the first electrical connection pins 8 of the insulated glazing unit with the second electrical connection pins 28 of the frame 2 (FIGS. 4, 5).

Figures 3, 4:
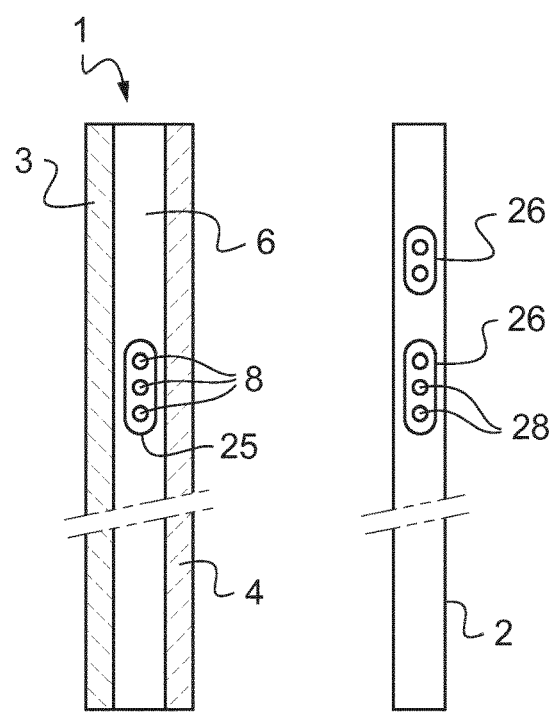
FIG. 3 represents a side view of an insulated glazing unit of a window or door element according to the invention.
FIG. 4 represents a side view of a frame of a window or door element according to the invention.

FIG. 3 represents a side view of an insulated glazing unit of a window or door element according to the invention. A plurality of first electrical connection pins 8 can be grouped together on the same support 25, as shown in FIG. 3. This allows the installation of the electrical connection pins 8 to be facilitated during manufacture of the insulated glazing unit 1.

If the insulated glazing unit 1 comprises a plurality of devices 16 designed to be electrically supplied, each device is connected to different first electrical connection pins 8, said first electrical connection pins forming or not forming part of the same support 25.

FIG. 4 represents a side view of a frame of a window or door element according to the invention. FIG. 5 represents a front view of a frame of a window or door element according to the invention.

The frame 2 comprises at least one second electrical connection pin 28 designed to enter into contact with the at least one first electrical connection pin 8 of the insulated glazing unit 1 when the insulated glazing unit 1 is inserted into the frame 2, so as to enable an electrical connection between the first electrical connection pins 8 of the insulated glazing unit 1 and the second electrical connection pins 28 of the frame 2.

As shown in FIG. 5, the second electrical connection pins 28 of the frame 2 have a length at least equal to the thickness of the edge of the frame 2. The end of each second electrical connection pin 28 oriented towards the interior of the frame is intended to be in electrical contact with one of the ends of a first electrical connection pin 8 when the insulated glazing unit 1 is inserted into the frame 2 and the end of each second electrical connection pin 28 oriented towards the exterior of the frame is intended to be connected by wired connection to an electrical supply.

A plurality of second electrical connection pins 28 of the frame can also be grouped together on the same support 26, as shown in FIG. 4 or in FIG. 5. The frame can comprise a plurality of supports 26 of second electrical connection pins 28, which may or may not be on the same side of the frame.

Each device 16 designed to be electrically supplied can for example be intended to be connected to a group of first/second electrical connection pins 8, 28 or to one support 25, 26 each. Thus, the positioning on the insulated glazing 1/the frame 2 of a group of first/second electrical connection pins 8, 28 or of a support 25, 26 can be characteristic of a type of device 16 designed to be electrically supplied. This makes it possible to facilitate connection during insertion of the insulated glazing unit into the frame, and therefore changing the insulated glazing unit 1.

The number of second electrical connection pins 28 of the frame 2 can be greater than the number of first electrical connection pins 8 of the insulated glazing unit 1, which makes it possible to increase the number of devices 16 designed to be electrically supplied in the insulated glazing unit 1 or to change the insulated glazing unit 1 to another one comprising a different device 16 designed to be electrically supplied. Thus, the frame 2 can comprise, as of the manufacture thereof, a plurality of groups of second electrical connection pins 28 or supports 26, ready to be connected to a plurality of groups of first electrical connection pins 8 or supports 25 on the insulated glazing unit 1, even if the insulated glazing unit 1 includes only a single device 16 designed to be electrically supplied. The change for an insulated glazing unit comprising a different device 16 designed to be electrically supplied or for an insulated glazing unit comprising a plurality of devices 16 designed to be electrically supplied will then be greatly facilitated since the frame 2 will already have all the pins necessary for connection of all the functionalities of the insulated glazing unit. Therefore, it may occur that some second electrical connection pins 28 are then not connected.

Different devices 16 designed to be electrically connected are connected to different first electrical connection pins 8. Also, all the first electrical connection pins 8 of the insulated glazing unit 1 that are connected to a device 16 designed to be electrically supplied are in electrical contact with second electrical connection pins 28 of the frame 2 when the insulated glazing unit 1 is mounted in the frame 2.

Preferably, different second electrical connection pins 28 of the frame 2 can be connected at different voltages in order to adapt to different type(s) of device(s) 16, designed to be electrically supplied, of the insulated glazing unit.

As shown in FIG. 5, the second electrical connection pins 28 of the frame 2 can be spring-loaded pins. Thus, when the insulated glazing unit 1 is inserted into the frame 2, the electrical contact between the first electrical connection pins 8 of the insulated glazing unit 1 and the second electrical connection pins 28 of the frame 2 is guaranteed.

FIG. 6 represents an exploded view of a window or door element according to the invention. The insulated glazing unit 1 can be removed from the frame 2 in order that the insulated glazing unit can be changed in the event of damage or when the user of the window or door element wishes to change the functionalities of the insulated glazing unit. In order to facilitate the change of insulated glazing unit, one of the edges 22 of the frame 2 is removable, as shown in FIG. 6. Preferably, the removable edge 22 of the frame 2 is attached to the fixed part of the frame 2 by snap-fitting, for example with tabs 27 of the removable edge 22 provided with a rib that cooperates with grooves or ribs 24 of the fixed part of the frame 2, or by screwing.

When the insulated glazing unit 1 is inserted into the frame 2 and the removable edge 22 of the frame is put back in place thereupon, the first electrical connection pins 8 of the insulated glazing unit 1 press upon the second electrical connection pins 28 of the frame 2, even more when the latter are spring-loaded.

Preferably, the removable edge 22 of the frame 2 is the edge opposite the edge of the leaf having hinges 23.

Also preferably, and in order to facilitate the insertion/removal of the insulated glazing unit 1 relative to the frame 2, the insulated glazing unit 1 is provided with first slide elements 10, 11 on at least one of the edges thereof, preferably on two opposite edges thereof, and the frame 2 is provided with second slide elements 20, 21 on at least one of the edges thereof, preferably on two opposite edges thereof, the first sliding elements 10, 11 of the insulated glazing unit 1 being designed to cooperate with the second sliding elements 20, 21 of the frame 2.

Thus the insulated glazing unit 1 can easily be removed from the frame 2, even though it is provided with a device 16 designed to be electrically supplied.

The invention also relates to a window or a door comprising a casing 3 on which is articulated the leaf formed by the frame 2 and the insulated glazing unit 1 inserted into the frame 2.

The invention claimed is:

1. A window or door element comprising a frame and an insulated glazing unit removably disposed in the frame, the insulated glazing unit comprising at least one first electrical connection pin and the frame comprising at least one second electrical connection pin, the at least one first electrical connection pin of the insulated glazing unit being in electrical contact with the at least one second electrical connection pin of the frame when the insulated glazing unit is inserted into the frame such that connection and disconnection between the at least one first electrical connection pin and the at least one second electrical connection pin are established by moving the frame and the insulated glazing unit relative to each other.

2. The window or door element as claimed in claim 1, wherein the insulated glazing unit comprises:
   - at least two glass panes spaced apart two by two by a spacer frame surmounted by a gasket, the spacer frame and the gasket being between the at least two glass panes in proximity to edge of the at least two glass panes,
   - at least one device adapted to be electrically supplied, disposed between the at least two glass panes that are adjacent, each device adapted to be electrically supplied being electrically connected to at least one of the least one first electrical connection pin of the insulated glazing unit.

3. The window or door element as claimed in claim 1, wherein different separate devices adapted to be electrically supplied are connected to different first electrical connection pins, an assembly of the first electrical connection pins of the insulated glazing unit connected to a device adapted to be electrically supplied being in electrical contact with second electrical connection pins of the frame when the insulated glazing unit is mounted in the frame.

4. The window or door element as claimed in claim 1, wherein different second electrical connection pins of the frame are adapted to be connected respectively at different voltages in order to adapt to a type of device, adapted to be electrically supplied, of the insulated glazing unit.

5. The window or door element as claimed in claim 1, wherein a number of second electrical connection pins of the frame is greater than a number of first electrical connection pins of the insulated glazing unit.

6. The window or door element as claimed in claim 1, wherein the at least one first electrical connection pin of the insulated glazing unit is attached in the gasket in such a way that an end of the at least one first electrical connection pin is flush with a surface of the insulated glazing unit.

7. The window or door element as claimed in claim 1, wherein the at least one second electrical connection pin of the frame is a spring-loaded pin making it possible to ensure good electrical contact with the at least one first electrical connection pin of the insulated glazing unit.

8. The window or door element as claimed in claim 1, wherein the at least one device adapted to be electrically supplied is at least one of:
   - an electroluminescent device comprising surface organic light emitting diodes or an inorganic thin film electroluminescent layer or inorganic light-emitting diodes,
   - an electrochromic device,
   - a liquid crystal variable diffusion device actuable between two states called transparent and opaque,
   - a device with a heating layer,
   - an active matrix display screen, particularly active matrix OLED screens,
   - a sensor.

9. The window or door element as claimed in claim 8, wherein, when the electroluminescent device comprises inorganic light emitting diodes, the electroluminescent device also comprises a light guide and light extraction system, the inorganic light emitting diodes being disposed on a support of a printed circuit board that is coupled to an edge of a light-guide forming sheet, said light-guide forming sheet being formed by one of glass panes of the insulated glazing unit or by a sheet of transparent plastic disposed between two adjacent glass panes against one of the at least two glass panes of the insulated glazing unit, and the light extraction system being on or in the light guide.

10. The window or door element as claimed in claim 1, wherein the frame includes edges and one of the edges of the frame is removable in order that the insulated glazing unit is insertable therein or removable therefrom.

11. The window or door element as claimed in claim 10, wherein the removable edge of the frame is attached to the fixed part of the frame by snap-fitting or screwing.

12. The window or door element as claimed in claim 1, wherein the insulated glazing unit is provided with first slide elements on at least one of edges thereof and the frame is provided with second slide elements on at least one of inner edges thereof, the first slide elements of the insulated glazing unit being adapted to cooperate with the second slide elements of the frame in order to facilitate insertion and removal of the insulated glazing unit relative to the frame.

13. A window or door leaf adapted to be articulated to a window or door casing, the window or door leaf comprising the window or door element as claimed in claim 1, wherein the window or door element further comprises hinges on one of edges thereof.

14. The window or door leaf as claimed in claim 13, wherein the frame includes edges and one of the edges of the frame is removable in order that the insulated glazing unit is insertable therein or removable therefrom, wherein the removable edge of the frame is attached to the fixed part of the frame by snap-fitting or screwing and wherein the edge provided with hinges is opposite to the removable edge.

15. A window or door comprising a window or door leaf as claimed in claim 13, and a window or door casing on which the window or door leaf is articulated.

16. The window or door element as claimed in claim 1, wherein the insulated glazing unit comprises at least two first electrical connection pins and the frame comprises at least two second electrical connection pins.

17. The window or door element as claimed in claim 9, wherein the sheet of transparent plastic disposed between two adjacent glass panes is against one of the glass panes of the insulated glazing unit.

18. The window or door element as claimed in claim 12, wherein the insulated glazing unit is provided with first slide elements on two opposite edges thereof, and the frame is provided with second slide elements on two opposite inner edges thereof.

* * * * *